(12) United States Patent
Oishi et al.

(10) Patent No.: US 6,329,620 B1
(45) Date of Patent: Dec. 11, 2001

(54) FLAT FOOT SWITCH UNIT WITH NON-SLIPPAGE STRUCTURE

(75) Inventors: Toshimitsu Oishi, Akashi; Toru Okubo, Kobe, both of (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/512,224

(22) Filed: Feb. 24, 2000

(30) Foreign Application Priority Data

Apr. 9, 1999 (JP) .................................................. 11-103408

(51) Int. Cl.[7] .................................. H01H 3/14; H01H 9/02
(52) U.S. Cl. ........................ 200/86.5; 200/86 R; 200/307
(58) Field of Search ................... 200/5 A, 61.89, 200/86 R, 52 R, 86.5, 307

(56) References Cited

U.S. PATENT DOCUMENTS

| | | | |
|---|---|---|---|
| 4,121,488 | | 10/1978 | Akiyama ........................ 200/86.5 R |
| 4,224,484 | * | 9/1980 | Haaas et al. ..................... 200/307 X |
| 4,403,122 | * | 9/1983 | Wise, III ............................. 200/307 |
| 4,417,105 | * | 11/1983 | Glaser, Jr. ...................... 200/307 X |
| 4,497,989 | * | 2/1985 | Miller .................................. 200/86 R |
| 4,684,767 | | 8/1987 | Phalen .................................. 200/5 A |
| 5,340,953 | * | 8/1994 | Krebs et al. ......................... 200/86.5 |
| 5,702,799 | | 12/1997 | Brown et al. ......................... 428/163 |
| 5,712,460 | * | 1/1998 | Carr et al. ............................ 200/86.5 |
| 5,837,952 | | 11/1998 | Oshiro et al. ...................... 200/86 R |
| 6,078,014 | * | 6/2000 | Kashiwazaki et al. ........... 200/61.43 |
| 6,110,073 | * | 8/2000 | Saur et al. ................................. 482/8 |

FOREIGN PATENT DOCUMENTS

| | | | |
|---|---|---|---|
| 1043745-A1 | * | 10/2000 | (EP) . |
| 2248723 | | 4/1992 | (GB) . |
| 63-11089 | | 1/1988 | (JP) . |
| 63-74178 | | 5/1988 | (JP) . |
| 8-270167 | | 10/1996 | (JP) . |
| 9-326216 | | 12/1997 | (JP) . |

* cited by examiner

*Primary Examiner*—J. R. Scott
(74) *Attorney, Agent, or Firm*—Jordan and Hamburg LLP

(57) ABSTRACT

A flat foot switch unit has a surface has a slippage-preventing measure. In this, a foot switch section has a four-sided surface shape and step-motion-detectable foot switches internally formed in nine regions by dividing the surface shape in 3×3. Furthermore, the foot switch section has slippage-preventing linear grooves at least in the regions on the surface of the top layer of a first sheet unit, which is part of the surface shape, and in which the foot switches are arranged.

18 Claims, 15 Drawing Sheets

FLAT FOOT SWITCH UNIT WITH NON-SLIPPAGE STRUCTURE

BACKGROUND OF THE INVENTION

1. Field of the Invention

The present invention relates to a flat foot switch unit having a predetermined surface shape, in which a stepping-motion-detecting pressing switch is internally arranged in at least one of regions formed by dividing the surface shape. In particular, the invention is suitable for a flat foot switch unit that can detect stepping motions for a game machine that guides a game player to stepping motions (foot performance) and the like so as to allow the game player to dance.

2. Description of the Related Art

Hitherto, home-use mat switches that allow multiple data items to be inputted to an apparatus for operation of an image terminal connected to the apparatus have been known from publications, such as Japanese Patent No. 2816837. These mat switches are flat foot switches in which a plurality of pressing switches that can detect stepping motions performed by the user are internally arranged. Specifically, the mat switches have a laminated-structure section in which an upper electrode sheet, a spacer, and a lower electrode sheet are sequentially laminated in a plurality of switch regions provided for input of a plurality of data items into the apparatus, thereby allowing the user to perform stepping motions for switching operation.

In the mat switches, however, no slippage-preventing measure is provided on the surface on which the user performs stepping motions, causing a problem in that the user's feet slip during stepping motions.

SUMMARY OF THE INVENTION

In view of the above, an object of the present invention is to provide a flat foot switch unit having a slippage-preventing measure on the surface.

To these ends, according to the present invention, a flat foot switch unit having a predetermined surface shape and a stepping-motion-detecting pressing switch arranged internally in at least one of a plurality of regions formed by dividing the surface shape, has slippage-preventing means provided at least in the regions on the surface of the top layer of a sheet unit, which is part of the surface shape, and in which the pressing switches are arranged.

According to this invention, the slippage-preventing means is provided at least in the regions where the pressing switches are provided on the surface of the sheet unit which is the top face, thereby allowing the prevention of the problem in which the game player slips on the sheet surface or slips falling down during stepping motions. Consequently, the game player and the like can reliably perform switching operations by stepping on the regions on the surface of the sheet unit where the pressing switches are arranged.

In the above case, the slippage-preventing means may be formed of a plurality of grooves on the surface of the sheet unit. This allows slippage in stepping motions to be effectively prevented.

Also, a home position may be provided on the sheet unit, wherein the grooves are formed in a direction diagonal to a direction from the home position to positions where the individual pressing switches are arranged. Therefore, the grooves cross always the step-out direction, whereby slippage in stepping motions can be prevented even more effectively.

Also, the grooves may be provided in only regions where the pressing switches are arranged, and the direction in which the grooves are formed differs depending upon the region. This allows slippage in stepping motions to be prevented even more reliably and effectively.

Also, the direction in which the grooves are formed may be a substantially 45° diagonal direction. This allows slippage in stepping motions to be prevented even more effectively.

Also, the direction in which the grooves may be substantially +45° and −45° diagonal directions. This allows slippage in stepping motions can be prevented even more effectively.

Also, the predetermined surface shape may be a four-sided shape, in which the grooves are formed parallel to a diagonal direction of the four-sided shape. This allows slippage in stepping motions to be prevented even more effectively.

Also, the four-sided shape may be divided into 3×3 regions, the home position may be arranged in the central region, and the individual pressing switches may be arranged in regions at two vertical sides and at two horizontal sides as viewed from the home position. Therefore, the grooves cross the step-out direction, thereby allowing slippage in stepping motions to be prevented even more effectively.

Furthermore, the sheet unit may be made of ethylene-methyl methacrylate. This allows slippage in stepping motions to be prevented even more effectively.

DESCRIPTION OF THE PREFERRED EMBODIMENT

Figure 1:
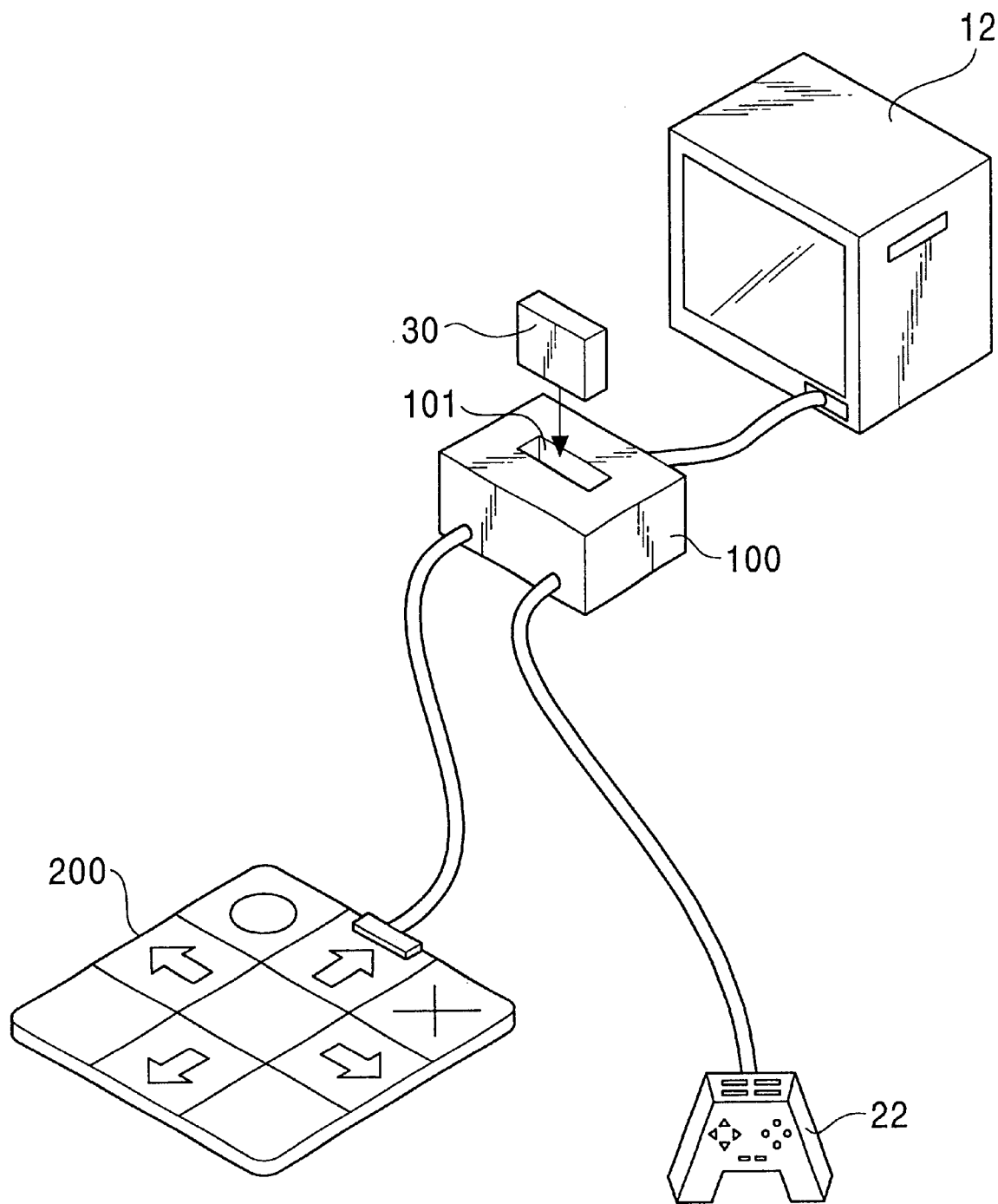
FIG. 1 is an overall appearance view of a home-use game machine to which the present invention is applied.

FIG. 1 is an overall view of a home-use game machine to which the present invention is applied. The game machine is constituted of a game-machine main unit 100, a controller 22 that is connected to the game-machine main unit 100 and that allows a game player to input various instructions, a foot switch unit 200 that is connected to the game-machine main unit 100 and that detects stepping motions of the game player in a dance game, and a monitor 12 (which is called a "monitor", hereinbelow) for displaying dance game screens. In the game-machine main unit 100, a recording medium 30 in which data such as dance-game program data is recorded is removable from a loader 101.

Figure 2:
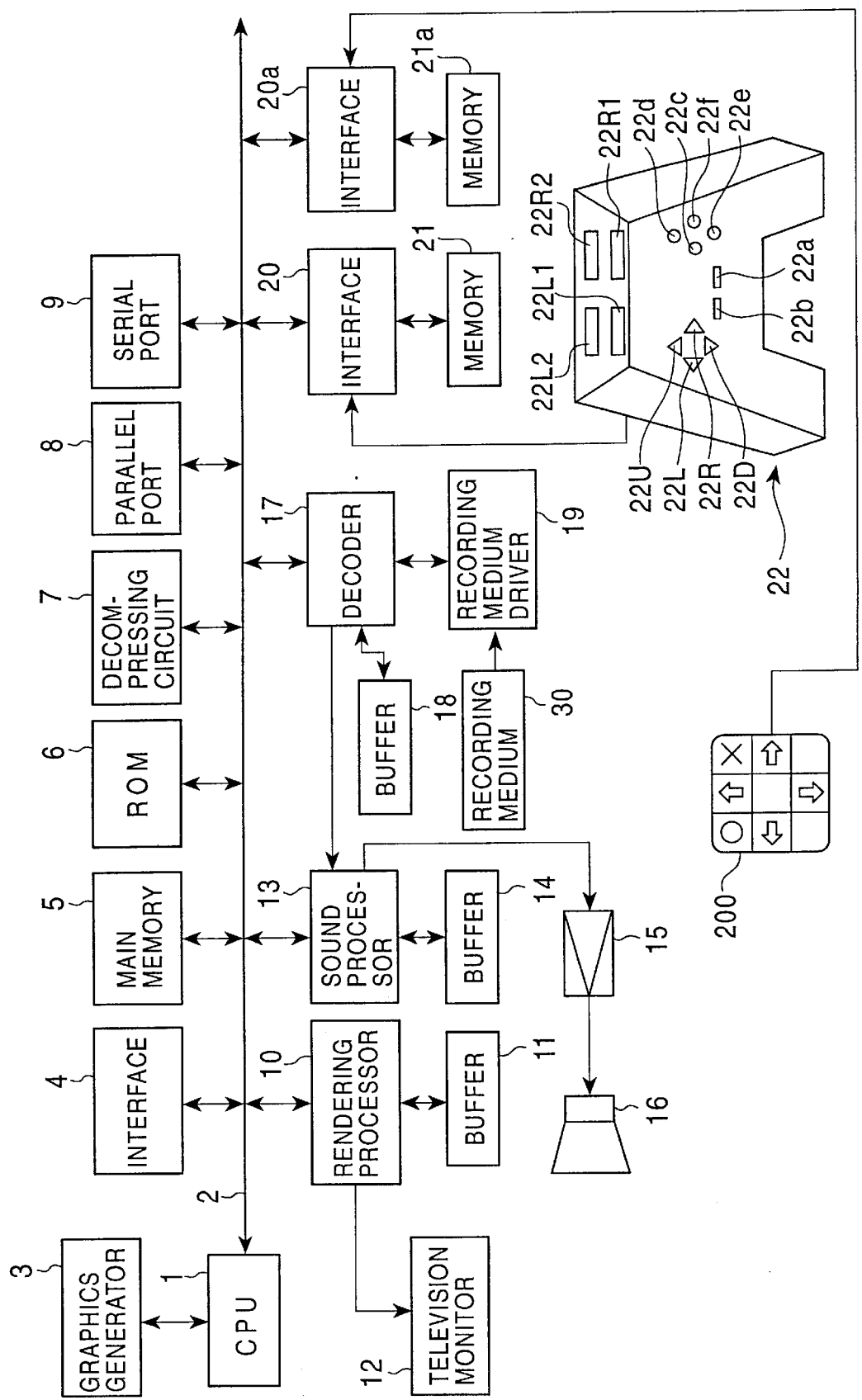
FIG. 2 is an internal schematic view of an example game system in accordance with the game machine.

In this arrangement, there are two interfaces 22 and 22a, and the foot switch unit 200 is connected to one of them, that is, the interface 20a (shown in FIG. 2). However, in an arrangement in which two controllers 22 must be connected, both the interfaces 20 and 20a may be connected to the controller 22. In this case, the foot switch unit 200 may be connected to another interface circuit 4 in the game-machine main unit 100 (shown in FIG. 2), which is described below.

FIG. 2 is an internal schematic view showing an example game system for the game machine. The game-machine main unit 100 of this game system has a CPU 1; a bus 2 including a address bus, a data bus, and a control bus which are individually connected to the CPU 1; and individual components connected to the bus 2.

The bus 2 is connected to a graphics-data generator 3, the interface circuit 4, a main memory 5, a ROM 6, a decompressing circuit 7, a parallel port 8, a serial port 9, a rendering processor 10 with a buffer 11, a sound processor 13 with a buffer 14, a decoder 17 with a buffer 18, and the interface circuits 20 and 20a with memories 21 and 21a.

The monitor 12 is connected to the rendering processor 10. A speaker 16 is connected to the sound processor 13 via an amplifying circuit 15. A recording-medium driver 19 is connected to the decoder 17. The memory 21 and the controller 22 are connected to the interface circuit 20. The memory 21a and the foot switch unit 200 are connected to the interface circuit 20a.

The game system varies in configuration according to its use. For home-use configuration of the game-machine main unit 100, the monitor 2 and the speaker 16 are separated from the game-machine main unit. For commercial-use configuration of the above-described game system, however, all the components shown in FIG. 2 are integrally stored in a single housing.

When the game system is configured on the basis of a personal computer or a workstation as a nucleus, the monitor 2 corresponds to a display unit of the computer. The rendering processor 10, the sound processor 13, and the decompressing circuit 7 correspond to part of the program data stored in the recording medium 30 or hardware on an expansion board mounted into an expansion slot of the computer. The interface circuit 4, the parallel port 8, the serial port 9, and the interface circuit 20 correspond to the hardware on the expansion board mounted in the expansion slot of the computer. Also, the buffers 11, 14 and 18 correspond to the main memory 5 or individual areas of an expansion memory (not shown).

In this embodiment, a description will be given taking an example where the above-described game system is configured for home use.

EXAMPLE CONFIGURATION OF HOME-USE GAME SYSTEM

The individual components shown in FIG. 2 are described below.

The graphics-data generator 3 functions as a co-processor of the CPU 1. Specifically, the graphics-data generator 3 performs parallel processing for conversion of coordinates and computation of light sources, for example, operations of vectors and fixed-point matrix data strings. Main processings that the graphics-data generator 3 performs include computation of image brightness. The graphics-data generator 3 accesses coordinate data, translation data, and rotation data at the individual vertexes within a two-dimensional or three-dimensional surface in image data sent from the CPU 1, and obtains addresses of processing-object images in display areas. In this manner, the image brightness according to the distance from a virtually-set light source is computed.

The interface circuit 4 interfaces with peripheral devices, particularly, pointing devices, such as a mouse and a trackball. The ROM 6 contains program data as an operating system of the game system. The program data corresponds to a basic input output system (BIOS) of personal computers.

The decompressing circuit 7 decompresses images compressed by intraframe-coding according to the Moving Photographic Experts Group (MPEG) for moving pictures and the Joint Pictures Experts Group (JPEG) for still pictures. The decompressing includes decoding (decoding of data encoded by a variable length code (VLC)), inverse-quantizing, inverse-discrete-cosine transform (IDCT) processing, and intraframe-image decoding.

The rendering processor 10 renders images in the buffer 11 in response to a rendering command which the CPU 1 issues. The buffer 11 includes a display area and a nondisplay area. The display area is a generation area for data to be displayed on the monitor 12.

In this embodiment, the nondisplay area is a storage area for storing data including data for defining skeletons, model data for defining polygons, animation data for moving models, pattern data representing characteristics of individual animations, texture data, and color palette data. the texture data is two-dimensional image data. The color palette data is data for specifying colors of data such as the texture data. The CPU 1 pre-records these data items, which are stored in the recording medium 30, in the nondisplay area of the buffer 11 either in one time or a plurality of times according to the game progress status.

Rendering commands include a command for rendering two-dimensional images by using polygons and a command for rendering standard two-dimensional images. In this embodiment, the polygons are polygonal two-dimensional images, and triangles or rectangles are used.

The rendering command for rendering images by using the three-dimensional images is composed of polygon vertex address data in the display area in the buffer 11, texture address data which represents storing positions in the buffer 11 for the texture data to be pasted on the polygons, color palette address data which represents storing positions in the buffer 11 for color palette data representing the color of the texture data, and brightness data which represents the brightness of the texture data.

In these items of data, the polygon vertex address data is polygon vertex-coordinate data in a two-dimensional space by which the graphics-data generator 3 has replaced polygon vertex-coordinate data in a three-dimensional space, which had been sent from the CPU 1, by performing coordinate conversion according to the translation data and rotation data of the image.

The polygon vertex address data represents addresses in the display area in the buffer 11. The rendering processor 10 writes texture data corresponding to a range of the display area in the buffer 11, which is represented by three or four pieces of the polygon vertex address data. One object is composed of many polygons. The CPU 1 associates coordinate data for the individual polygons in the three-dimensional space with corresponding skeleton vector data, and stores the associated data in the buffer 11. Processes described below are executed in response to operations effected on the controller 22 for moving characters, i.e., for presenting motion of the characters or for changing character-viewing positions.

The CPU 1 supplies the graphics-data generator 3 with the vertex three-dimensional coordinate data for the individual polygons, which is preserved in the nondisplay area of the buffer 11, and the translation data and the rotation data on the individual polygons, which have been obtained from data on coordinates and the amount of rotation of the skeletons.

On the basis of the vertex three-dimensional data on the individual polygons and the translation data and the rotation data on the individual polygons, the graphics-data generator 3 sequentially obtains three-dimensional coordinate data after movement and rotation of the individual polygons. In the three-dimensional coordinate data on the individual polygons, which has thus been obtained, coordinate data in horizontal and perpendicular directions is supplied to the rendering processor 10 as the address data in the display area in the buffer 11, that is, as the polygon vertex address data.

The rendering processor 10 writes texture data represented by preallocated texture address data in the triangular or rectangular display area in the buffer 11, which is represented by three or four pieces of the polygon vertex address data. As a result, objects individually composed of many polygons on which texture data is pasted are displayed on the monitor 12.

The rendering command for rendering standard two-dimensional images is composed of vertex address data, texture address data, color palette address data which represents storing positions in the buffer 11 for the color palette data representing the color of the texture data, and brightness data which represents the brightness of the texture data. In these items of data, the vertex address data is coordinate data which the graphics-data generator 3 can obtain by performing coordinate conversion for vertex-coordinate data in a two-dimensional surface according to the translation data and the rotation data which had been sent from the CPU 1.

The sound processor 13 writes ADPCM (adaptive differential pulse code modulation) data read from the recording medium 30 into the buffer 14 and uses the ADPCM data stored in the buffer 14 as a sound source. Also, the sound processor 13 uses, for example, a clock having a frequency of 4.1 kHz to read out the ADPCM data. The sound processor 13 performs pitch conversion, addition of noise, envelope setting, level setting, addition of reverb, and the like for the ADPCM data read out of the buffer 14. When the sound data read out of the recording medium 30 is PCM (pulse code modulation) data, such as compact-disk digital audio (CD-DA), the sound processor 13 converts the data to ADPCM data. Also, processing by the program data for the PCM data is performed directly in the main memory 5. The PCM data processed in the main memory 5 is supplied to the sound processor 13 and is converted to the ADPCM data. Thereafter, and the ADPCM data is subjected to other processing described above and is outputted through the speaker 16 as sound data.

The recording-medium driver 19 is, for example, a CD-ROM drive, a hard-disk drive, an optical-disk drive, a flexible-disk drive, a silicon-disk drive, a cassette-medium-reading machine. As for the recording medium 30, it is, for example, a CD-ROM, a hard disk, an optical disk, a flexible disk, or semiconductor memory. The recording-medium driver 19 reads image, sound, and program data from the recording medium 30, and feeds the read data to the decoder 17. The decoder 17 performs error-correction processing for reproduced data sent from the recording-medium driver 19 by using error correction code (ECC) and feeds the corrected data to the main memory 5 or sound processor 13.

The memories 21 and 21a are made of, for example, a holder and a card memory. The card memory retains parameters for individual games so as to store, for example, a game completion status.

The controller 22 is externally operable operating means which the game player operates. The controller 22 has a first left button 22L1, a second left button 22L2, a first right button 22R1, a second right button 22R2, an up key 22U, a down key 22D, a left key 22L, a right key 22R, a start button 22a, a select button 22b, a first button 22c, a second button 22d, a third button 22e, and a fourth button 22f.

The up key 22U, the down key 22D, the leftward key 22L, and the right key 22R are used by the game player to request the CPU 1 to move a character, for example, upward, downward, rightward, and leftward. The start button 22a is used by the game player to contact the CPU 1 so as to start the game program loaded from the recording medium 30. The select button 22b is used by the game player to request the CPU 1 so as to execute options regarding the game program loaded from the recording medium 30 to the main memory 5. The first left button 22L1, the second left button 22L2, the first right button 22R1, and the second right button 22R2 function differently depending on the game program data loaded form the recording medium 30.

The foot switch unit 200 is, similarly to the above-described controller 22, externally operable operating means. It allows the game player to step thereon for operation. Hereinbelow, an example arrangement of the foot switch unit is given.

EXAMPLE ARRANGEMENT OF FOOT SWITCH UNIT

Figure 3:
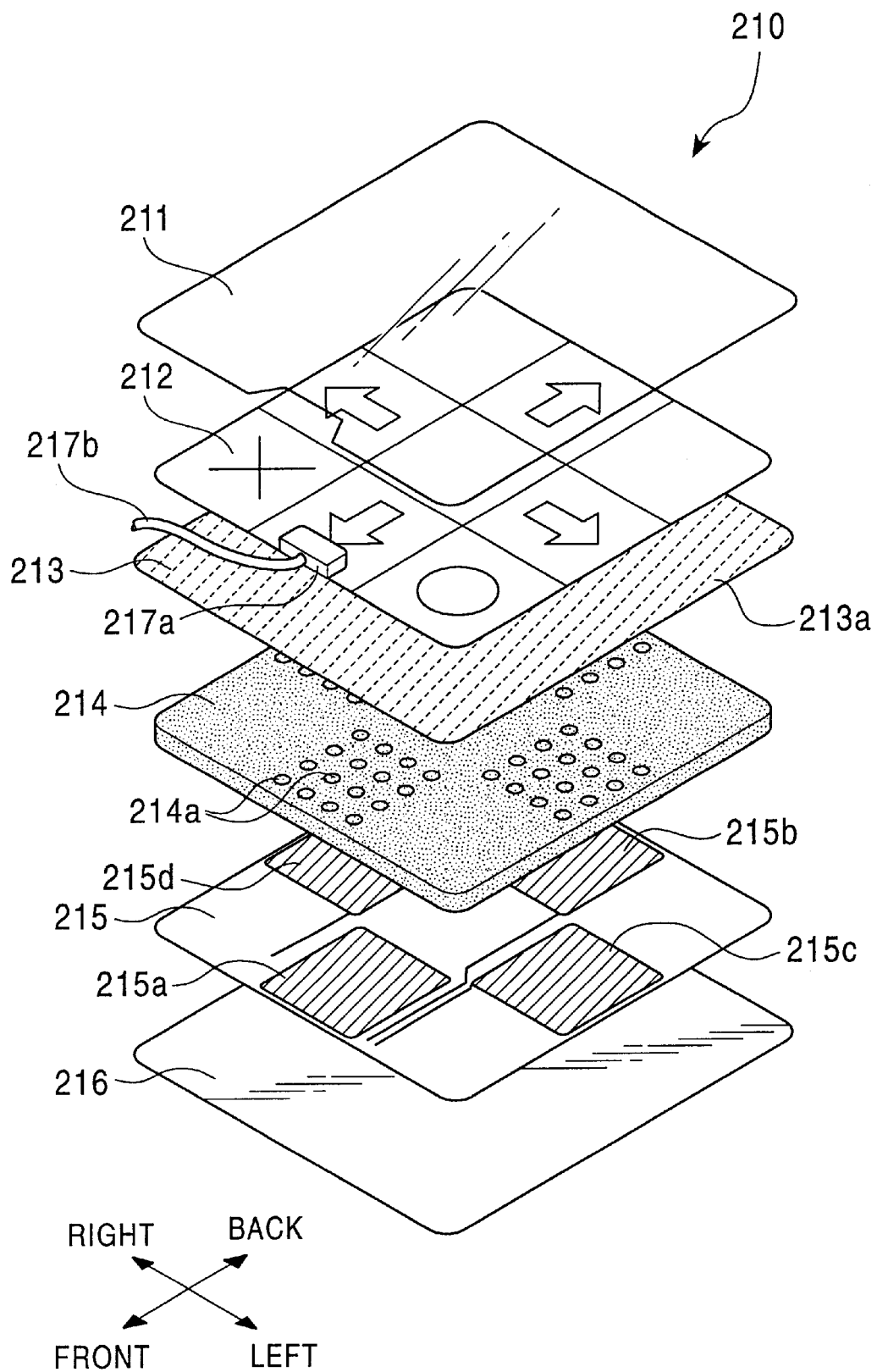
FIG. 3 is an overall construction view of a foot switch section of a foot switch unit.
Figure 4:
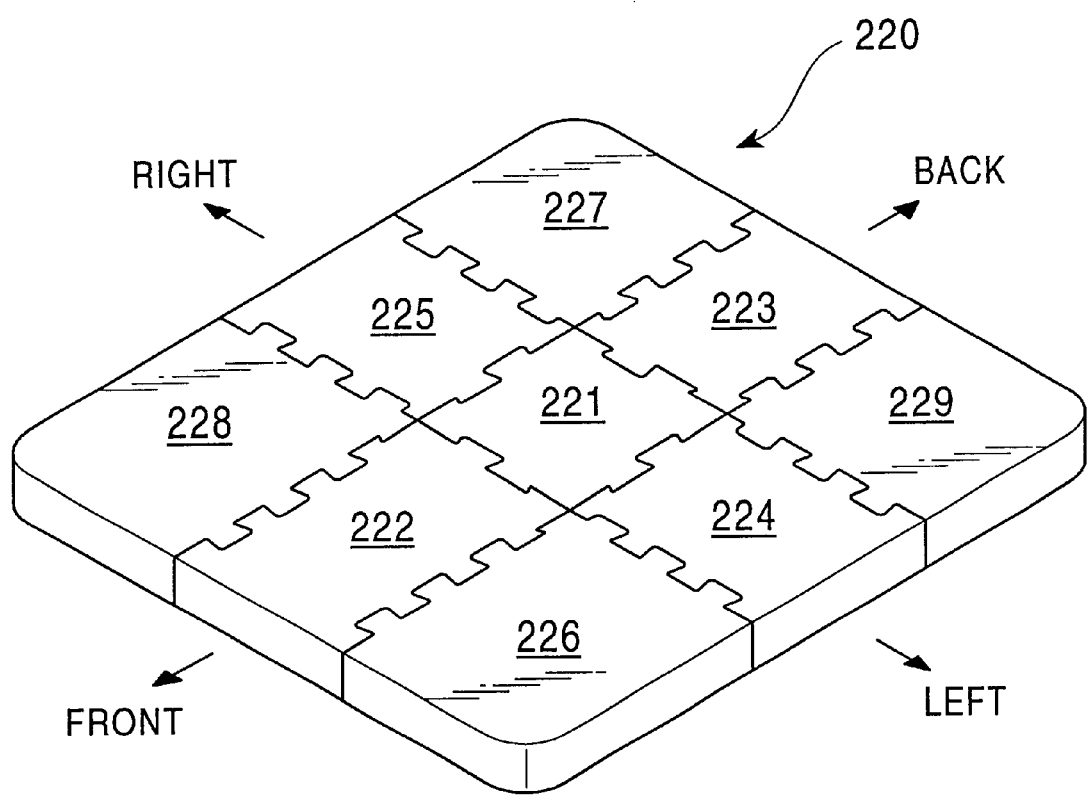
FIG. 4 is a view showing an overall construction of a mat section of the foot switch unit.

As shown in FIGS. 3 and 4, the foot switch unit 200 is composed of a planar foot switch section 210 (flat foot switch unit) having a rectangular shape (predetermined surface shape) and a thick mat section 220 which is also rectangular and is, for example, laid thereunder. Except for regions of a start button and select buttons (not shown) provided at right and left ends of an electrode-grouped section 217a, the square area of the foot switch section 210 is divided into 3×3 regions (which are referred to as "squares", hereinbelow).

A home position is arranged on the central square, which is a region where the game player initially stands. Foot switches (pressing switches) that can detect stepping motions are arranged inside the squares at front, back, left, and right sides (two sides in the vertical direction and two sides in the horizontal as viewed from the home position) of the central square.

Figure 5A:
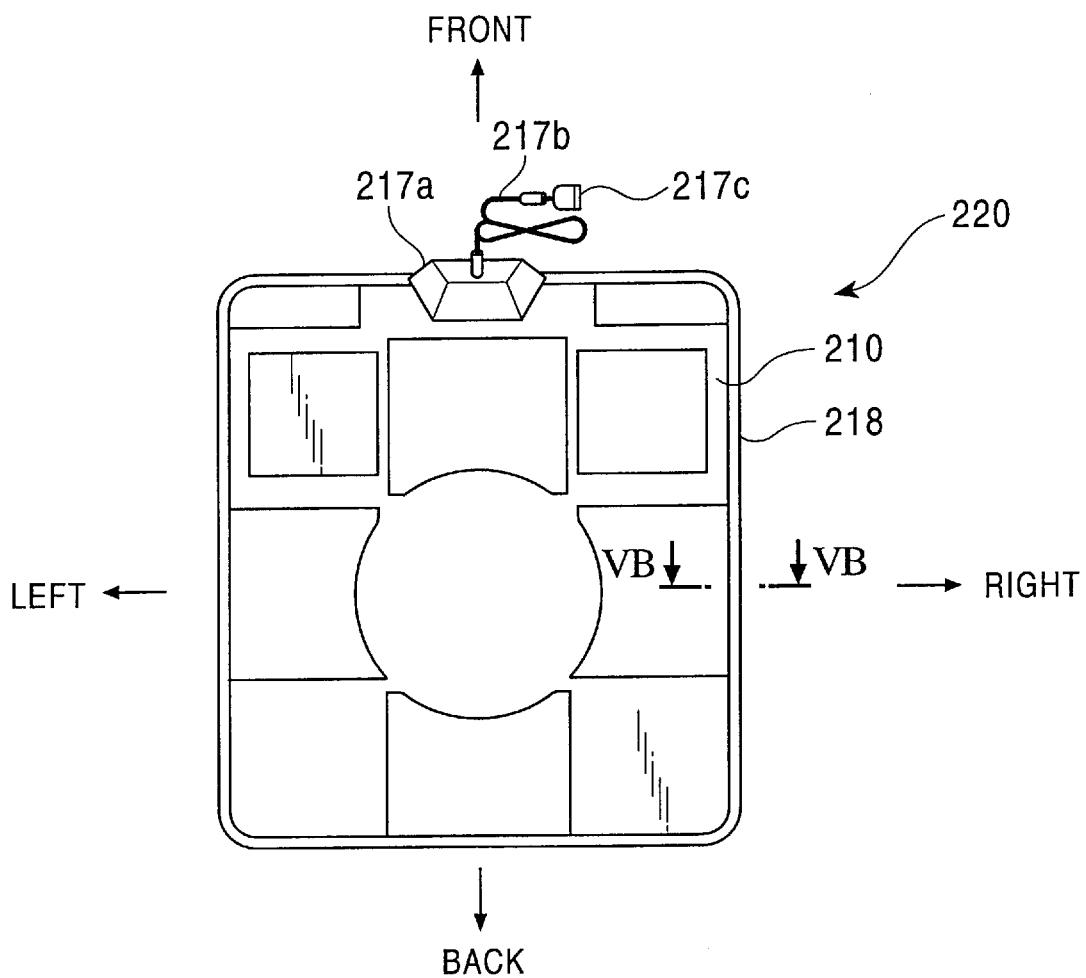
FIG. 5A is a plan view showing the foot switch section in detail.
Figure 5B:
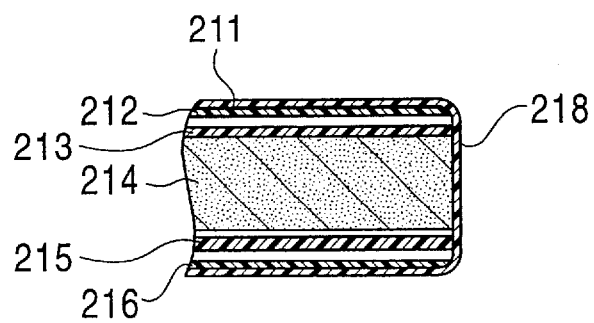
FIG. 5B is a cross-sectional view along the VB—VB line of the foot switch section in FIG. 5A.

The foot switch section 210 has a six layer construction. Viewed from top to bottom, they are a first sheet 211 (sheet unit) made of a transparent EMMA (ethylene-methyl methacrylate) unit, a printed soft-PVC second sheet 212, a soft-PVC third sheet 213 whose entire reverse surface is coated with carbon, a urethane fourth sheet 214, a PET fifth sheet 215 of which appropriate surface positions are coated with carbon, and an EVA-made sixth sheet 216. Also, as shown in FIGS. 5A AND 5B, the foot switch section 210 is formed such that its peripheral section is immobilized using a polyester tape 218 so that each of the sheets in the six-layer construction do not slide over each other. The materials indicated above are just examples, and they may be substituted by other materials having similar characteristics.

Figure 6:
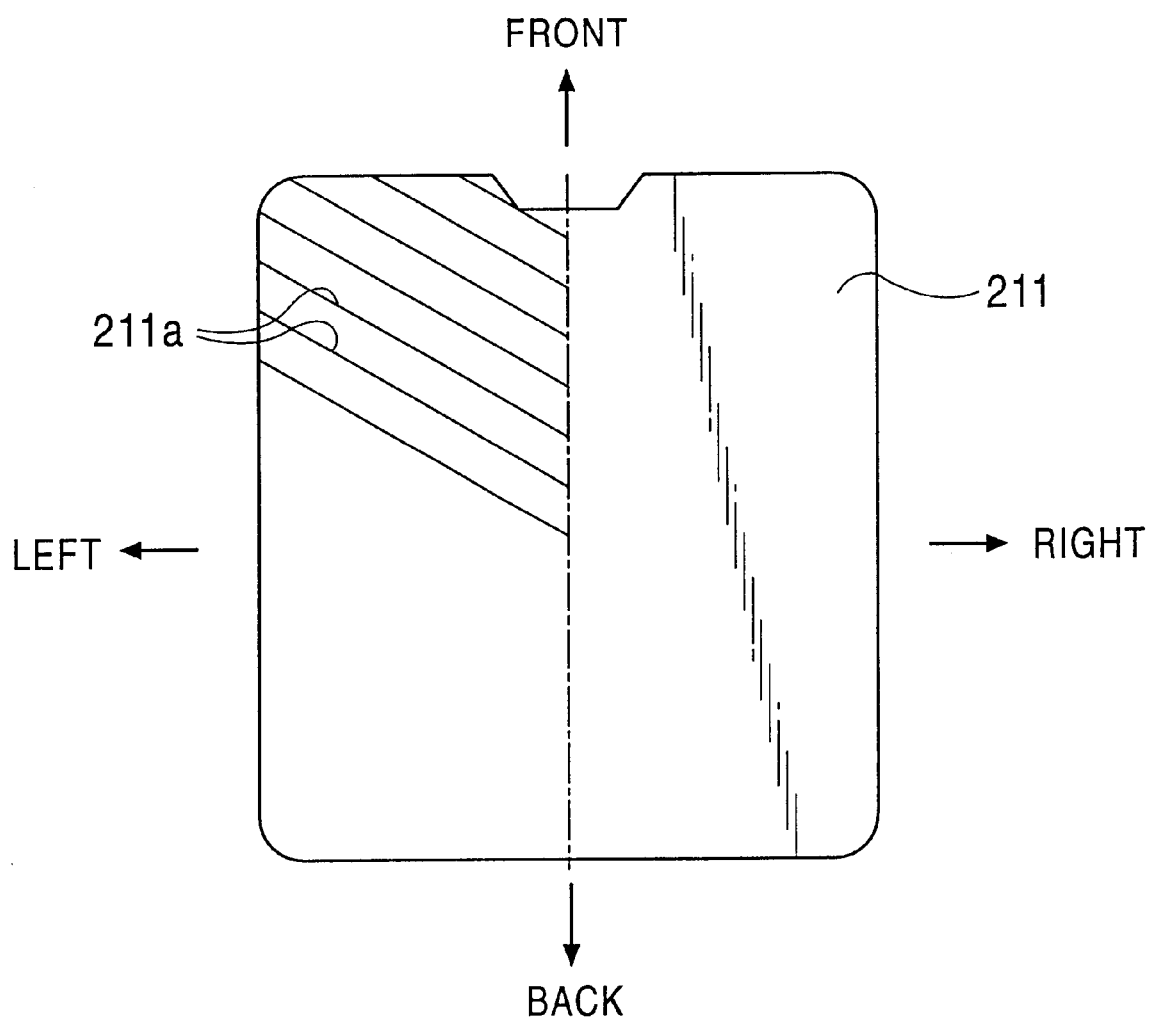
FIG. 6 is a plan view showing a groove pattern on the surface of a first sheet.

In the aforementioned sheets, since the first sheet 211 is directly stepped on by the game player, it must be durable, and in addition, it has a slip-preventing measure so as to ensure that the game player performs suitable stepping motions. In this embodiment, the first sheet 211 is made of the aforementioned EMMA which is a material that does not allow easy slippage; and, for example, shallow-grooving processing is applied over the entire surface of the sheet. The sheet 211 is grooved by means of a heating roller, a press, and a cutter. As a groove pattern, as shown in FIG. 6, linear grooves 211a (slippage-preventing means) are formed parallel to one diagonal direction of the foot switch section 210. The diagonal direction as described above is employed for the reasons described below.

In the dance game described below, the step position is varied to the front, back, left, and right squares with respect to the home position. Therefore, with linear grooves formed parallel to the back and forth direction or left-right direction, when the game player performs stepping motions parallel to the grooves, he or she may slip thereon. However, the linear grooves are formed in the direction parallel to the diagonal direction of the foot switch section 210, the foot-step direction intersects all the front, back, left, and right directions. It should be apparent that these groves have a slippage-preventing component. The grooves may be formed in both diagonal directions. Also, in view of the efficiency of the slippage prevention, the grooves are preferably formed with a pitch of about 2 mm, a depth of 0.02 mm, and a cuneiform or rectangular cross section.

Something to allow recognition of the positions of the foot switches (pressing switches) via the transparent first sheet 211 is printed on the sheet 212. For example, arrow marks (→, ←, ↑, and ↓) indicating directions from the central section are printed at positions on the foot switches provided on the front, back, left, and right with respect to the central section. Because the printing is provided on the second sheet 212, even when the game player repeats the stepping motion, the printing marks can be prevented from being erased.

The entire reverse surface of the third sheet 213 is coated with carbon, and the carbon forms a common electrode 213a. Carbon allows thin-film coating, and in addition, is suitable as the foot-switch electrode because of its good electrical conductivity and durability.

The fourth sheet 214 is used as a spacer that is elastically flexible so as to have almost zero thickness during the stepping motion by the game player. In addition, a plurality of small openings 214a passing through the sheet are provided in the squares on the front, back, left, and right with respect to the central section, which is an appropriate position of the sheet, scattering so that at least one of the holes corresponds to the bottom face of a person's foot.

Carbon is coated on parts of the surface of the fifth sheet 215, specifically, on specific squares on the front, back, left, and right with respect to the central section, and the carbon forms specific electrodes 215a to 215d of the foot switches. When the game player has performed the stepping motion, the common electrode 213a of the third sheet 213 electrically short-circuited to at least one of the specific electrodes 215a to 215d of the fifth sheet 215 through the small openings 214a of the fourth sheet 214. The size of the small openings 214a is predetermined to a size so that the openings are not pressed and closed completely when the game player has performed the stepping motion, for example, a diameter of 10 mm. For the sake of manufacturing, the small openings 214a of the fourth sheet 214 may be provided so as to be scattered uniformly on the entire surface of the fourth sheet 214.

In this way, the individual foot switches are formed of the common electrode 213a of the third sheet 213, the fourth sheet 214, and the specific electrodes 215a to 215d of the fifth sheet 215 in the positions of the squares corresponding to the four printed arrow marks described above.

The sixth sheet 216 must be durable to repeated stepping motions by the game player. It also must have strength sufficient to prevent the plastic deformation of the foot switches. Therefore, ETV is used as the material of the sixth sheet 216. Also, wiring is patterned and printed so as to extend from the four specific electrodes 215a to 215d of the fifth sheet 215 up to the front-end electrode-grouped section 217a that is to electrically connect to the interface circuit 20a of the game-machine main unit 100. In addition, an electrical cable 217b is connected to the electrode-grouped section 217a. The interface circuit 20a shown in FIG. 2 and a removable connection terminal 217c are provided at the end of the electrode-grouped section 217a.

In addition to the four foot switches described above, game-selecting switches (pressing switches) may be provided. In this case, the game-selecting switches are provided in portions where the foot switches are not provided, for example, in two squares in the front diagonal to the central section. Appropriate marks (for example, O and X marks) indicating the positions of the game-selecting switches are printed on the squares of the second sheet 212; the small openings 214a are provided in the fourth sheet 214; and specific electrodes 215e and 215f are formed on the fifth sheet 215. These specific electrodes 215e and 215f and the common electrode 213a of the third sheet 213 form the two game-selecting switches.

Figure 7:
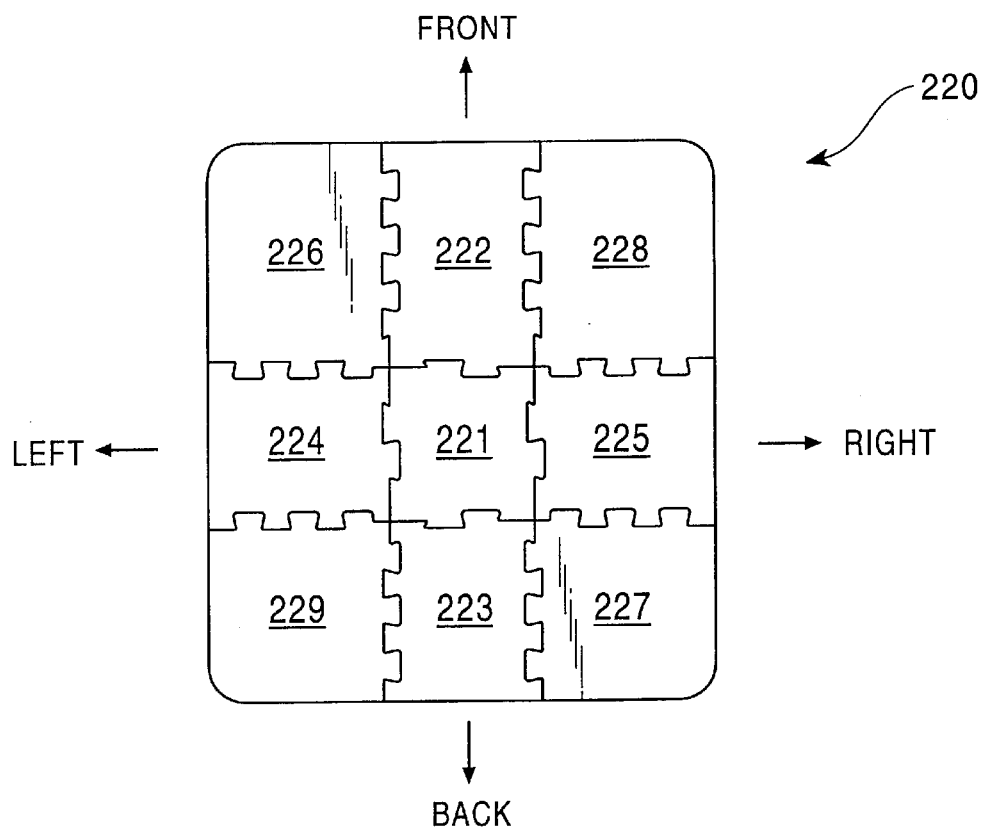
FIG. 7 is a plan view showing the construction of the mat section in detail.

The mat section 220 is assembled of nine (3×3) rectangular mat pieces each of which is somewhat larger than the heel of the game player. As shown in FIG. 7, mat pieces 222 to 225 corresponding to the positions where the foot switches are formed are arranged on the front, back, left, and right of a center piece 221; and mat pieces 226 to 229 are arranged in the remaining four portions, individually being engaged with each other via reverse-cuneiform projections and grooves.

Figure 8:
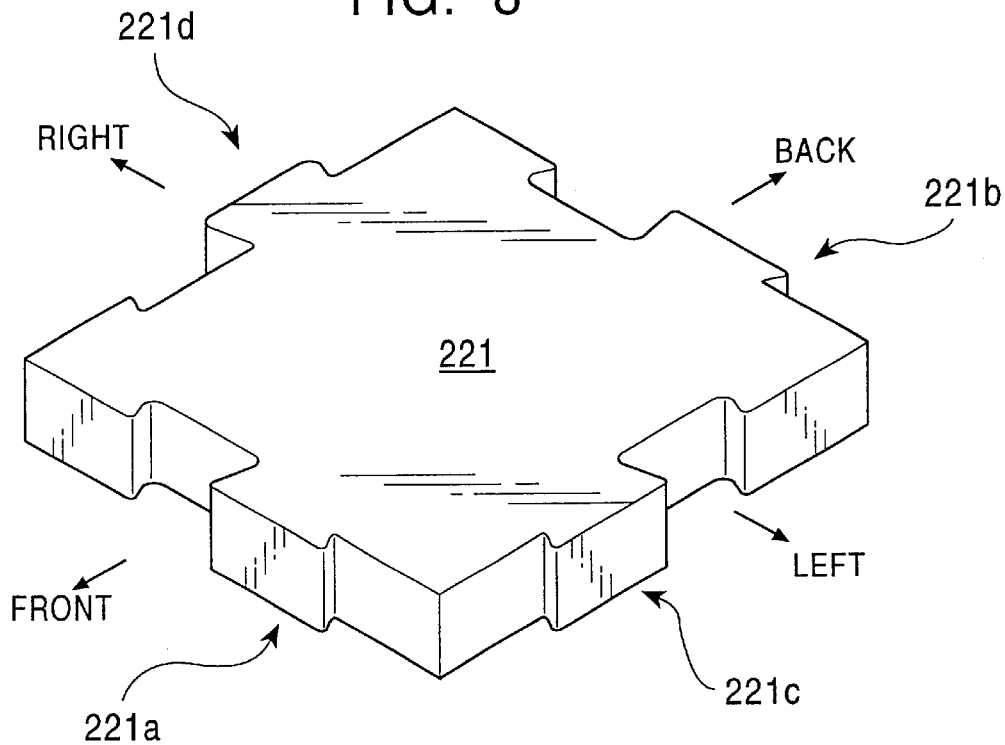
FIG. 8 is a perspective view showing the construction of a center piece.

As shown in FIG. 8, in the center piece 221, only an engaging section 221a of one side of the four sides is formed so as to be different in shape from other engaging sections 221b to 221c. This is because, in the four mat pieces 222 to 225 to be engaged directly with the center piece 221, the mat piece 222 to be arranged in the front is different in shape from others. That is, since the mat piece 222 must be formed somewhat longer by the length of electrode-grouped section 217a described above whereas other mat pieces 223 to 225 are identically shaped, no problems arise even when the engaging sections are identically shaped, and in addition, sharing can be implemented, whereby assembly is facilitated. Specifically, the shape of the assembly of the reverse-cuneiform projection and groove of the engaging section 221a is arranged such that the shape of the assembly of the reverse-cuneiform projection and groove of the engaging section 221a of the other individual engaging sections 221b to 221d is turned around. The projections and the grooves are arranged to have appropriate dimensions so as to be strong enough to be durable to repeated stepping motions by the game player.

All the mat pieces 221 to 229 opposing the foot switches are made of resin so as to secure sound-proofing effects. Among these mat pieces, the mat pieces 222 to 225 are made of a relatively soft material, such as sponge or polyethylene. On the other hand, the other mat pieces 226 to 229 are formed of a relatively rigid material, such as EVA. The mat piece is differentiated in hardness depending on whether or not it opposes the foot switch, whereby different touch is caused so that the game player feels sinking in the mat when stepping on square positions corresponding to the foot switches whereas the game player feels almost no sinking in the mat when stepping on other square positions.

Thus, the above allows the game player to easily recognize whether or not he or she has stepped on the square positions corresponding to the foot switches without watching the foot to confirm the position during the game. The difference in hardness may be implemented by not only the material, but also surface treatment or shape. For example, many hemispherical protrusions may be formed so as to allow the foot to sense irregular touch, thereby providing substantial hardness sensibility.

Figure 9:
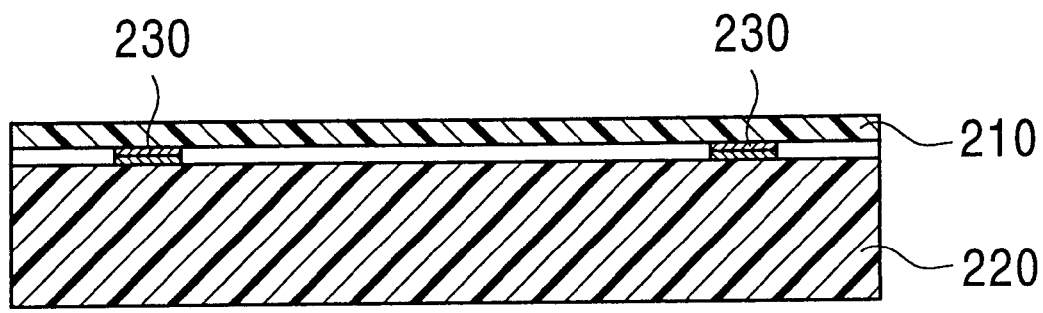
FIG. 9 is a side view of an example condition in which the foot switch section is mounted on an upper surface of the mat section.
Figure 10:
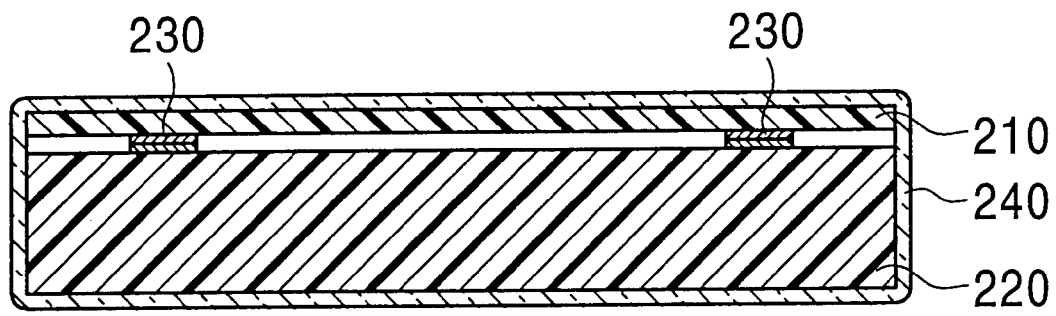
FIG. 10 is a side view of another example condition in which the foot switch section is mounted on an upper surface of the mat section.

As shown in FIG. 9, the foot switch section 210 is fixed at four places with, for example, face fasteners 230, on the upper surface of the mat section 220, thereby preventing the two from deviating during the game. Alternatively, as shown in FIG. 10, the assembly in which the foot switch section 210 is fixed on the upper surface of the mat section 220 with the face fasteners 230 may be further wrapped with an additional transparent sheet 240 so that almost no deviation occurs between the two. In this case, the mat section 220 is preferably an integral unit for the sake of manufacturing, although even divisional units can be engageable in the unit of the wrapped assembly described above. In addition, a slippage-preventing groove section is formed on the surface of the transparent sheet 240.

(Overall Operation of the Home-use Game System)

Referring to FIG. 2, a description will be given of an overall operation which the home-use game system performs. When a power switch (not shown) is turned on, the game system 1 is then powered on. At this time, if the recording medium 30 exists in the recording-medium driver 19, an operating system allows the CPU 1 to issue a command to the recording-medium driver 19 to read out program data from the recording medium 30. In response to this command, the recording-medium driver 19 reads out image, sound, and program data from the recording medium 30.

The read out image data, sound data, and program data is fed to the decoder 17, and the data is therein subjected to error-correcting processing. The image data subjected to the error-correcting processing is fed to the decompressing circuit 7, and is therein subjected to the above-described decompressing processing. Then, the data is fed to the rendering processor 10, and is thereby written into the nondisplay area of the buffer 11. The sound data subjected to the error-correcting processing in the decoder 17 is fed to one of the main memory 5 and the sound processor 13 and is written to one of the main memory 5 and the buffer 14. The program data subjected to the error-correcting processing in the decoder 17 is fed to the main memory 5 and is written thereto.

Subsequently, the CPU 1 executes the game according to the type of commands which the game player issues via the controller 22 and the switch unit 200. In particular, the CPU 1 performs image-processing control, sound-processing control, and internal-processing control as required according to the type of commands the game player issues via the controller 22 and the switch unit 200.

In this embodiment, the image-processing includes computation of coordinates of individual skeletons and computation of vertex-coordinate data of polygons on the basis of pattern data corresponding to animations which is directed to characters; supply of data such as computed three-dimensional coordinate data and viewing-position data to the graphics-data generator 3; and issuance of rendering commands including data such as address data and brightness data in the nondisplay area of the buffer 11.

The sound-processing control includes issuance of a sound-outputting command to the sound processor 13, and specification of the level, the reverb, and the like. The internal-processing control includes operations according to the operation effected on the controller 22.

(Game System Functions)

Figure 11:
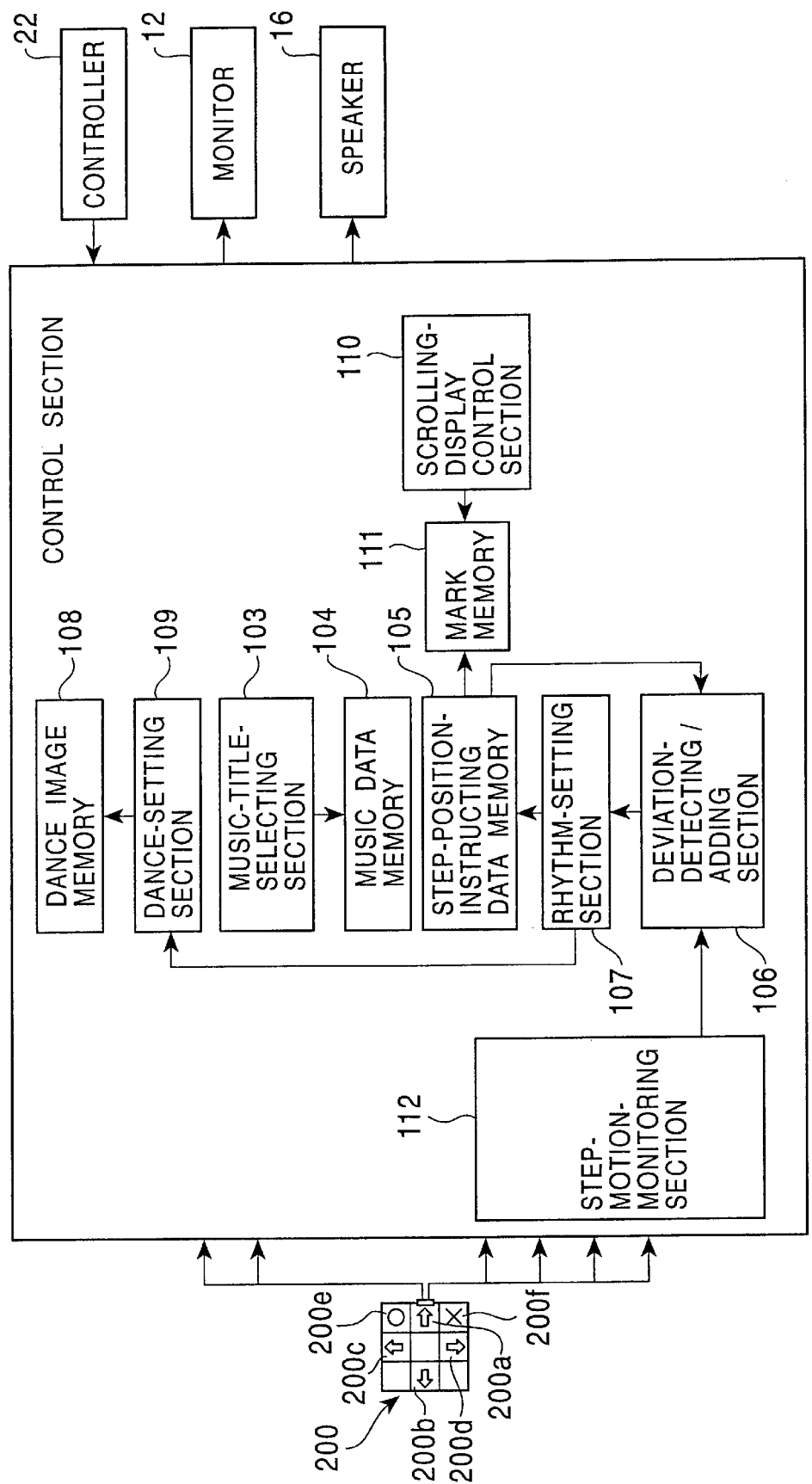
FIG. 11 is a functional schematic view of main sections of the game system.

FIG. 11 is a functional schematic view showing main sections in FIG. 2 referenced above. As functionally viewed, the control section totally controls operations of the game system. This control section is constituted of a music-title selecting section 103, a music data memory 104, a step-position-instructing data memory 105, a deviation-detecting/adding section 106, a rhythm-setting section 107, a dance image memory 108, a dance-setting section 109, a scrolling-display control section 110, a mark memory 111, and a step-motion-monitoring section 112. Also, the control section is connected to the external monitor 12, speaker 16, controller 22, and switch unit 200.

The music-title-selecting section 103 selects a music title corresponding to an instruction signal received from the switch unit 200 or the controller 22. The music data memory 104 stores music data of each music title, that is, music data of individual music pieces associated with music titles. According to this arrangement, in response to a selecting signal from the music-title-selecting section 103, the specified music data is outputted to the speaker 16 in time series.

Figure 12A:
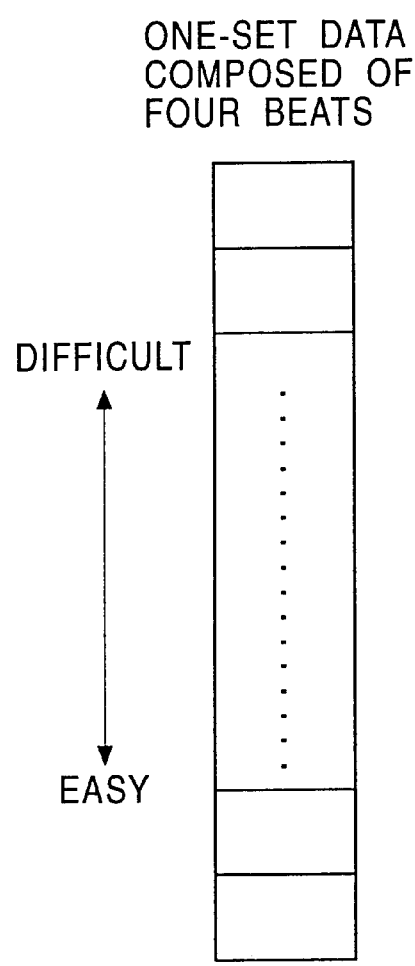
FIG. 12A is a memory map showing a condition in which many pieces of step-position data are stored according to difficulty levels

The step-position-instructing data memory 105 stores multiple pieces of step-position-instructing data corresponding to rhythms such as the number of beats (for example, four beats and eight beats) according to the rank of difficulty in a table format as shown in FIG. 12A. A sufficient number of the tables for storing the step-position-instructing data is prepared according to the type in the number of beats, and in addition, the type in rhythm with the same number of beats, for example, the type of music or individual music pieces.

For four beats, each piece of the step-position-instructing data is composed of an one-set data for four time-series instruction types. For eight beats, each piece of the step-position-instructing data is composed of the one-set data for eight time-series instruction types. One-set data is written into each area of the table in FIG. 12A. Also, in view of rhythm, for four beats, various types are prepared, including, for example, a type in which all the four beats have the same pitch or a type in which first two beats are short whereas latter two beats are fast. As for the step-position-instructing data in the same rank of difficulty, a plurality of types is preferably prepared. This embodiment selects a table corresponding to music specified by the music-title-selecting section 103 and outputs one-set data in the selected table to the speaker 16.

The deviation-detecting/adding section 106 obtains the amount of resultant deviation in execution of a step-motion instruction and an actual stepping motion. This embodiment measures timing deviation between the above two by use of an internal timer or the like, and obtains the amount of deviation in addition of the step-position-instructing data for the one-set data. According to the result of addition for the first step-position-instructing data which has been obtained by the deviation-detecting/adding section 106, the rhythm-setting section 107 performs evaluation for the one-set data which was second-previously defined for the one-set data in the third or following one-set data, as described below, for increasing or decreasing the level by one rank, and it outputs the result as a defining signal. Also, the defining signal from the rhythm-setting section 107 is also outputted to the dance-setting section 109.

Figure 12B:
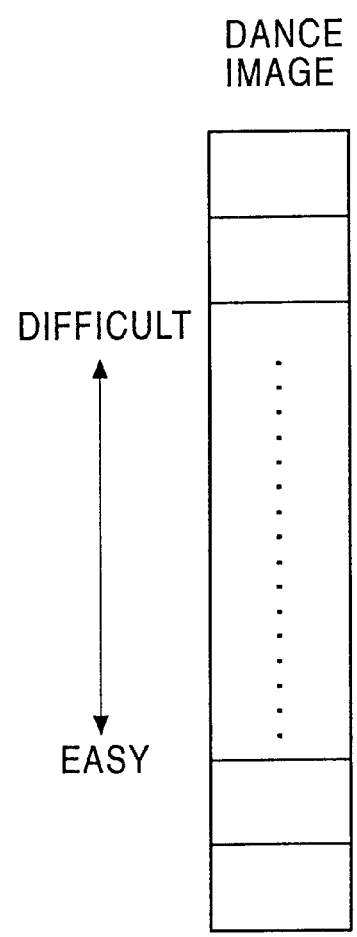
FIG. 12B is a memory map showing a condition in which many pieces of dance images are stored according to the difficulty levels.

The dance image memory 108 stores a dance image displayed on a display screen of the monitor 12 in the units corresponding to the one-set data, and has tables for storing dance images corresponding to music titles and rhythms. As shown in FIG. 12B, a plurality of the dance images is stored in each table according to the rank of difficulty. Also, multiple types of dance images in the same rank of difficulty are preferably prepared. Upon receipt of a defining signal corresponding to a rank of difficulty from the rhythm-setting section 107, the dance-setting section 109 reads tables, starting with a table in which a dance image is selected for the third or following one-set data.

The scrolling-display control section 110 performs scrolling-display on the display screen of the monitor 12. Step-position-instructing data (which is referred to as a "step-position-instructing mark", hereinbelow) for the one-set data, which was defined in the rhythm-setting section 107 and was read out of the step-position-instructing data memory 105, is replaced by image data and is temporarily stored in a mark memory 111. The mark memory 111 allows two continuous pieces of the one-set data to be written so that images of the step-position-instructing mark can be displayed on the display screen of the monitor 12 without being discontinued during scrolling display. The scrolling-display control section 110 allows writing the step-position-instructing mark from the mark memory 111 to the buffer 11 (FIG. 2) as a scrolling image in a such a manner as to shift readout addresses sequentially at a predetermined time interval. In this way, in addition to non-scrolling dance images, the scrolling step-position-instructing marks also are sequentially transferred to the buffer 11. Furthermore, contents of the buffer 11 are read out repeatedly at a cyclic period of, for example, 1/60 second by well-known display-scanning means and are displayed, step-position-instructing marks are scrolled and displayed, and in addition, dance images are animatedly displayed as background images on the display screen of the monitor 12.

Figure 13:
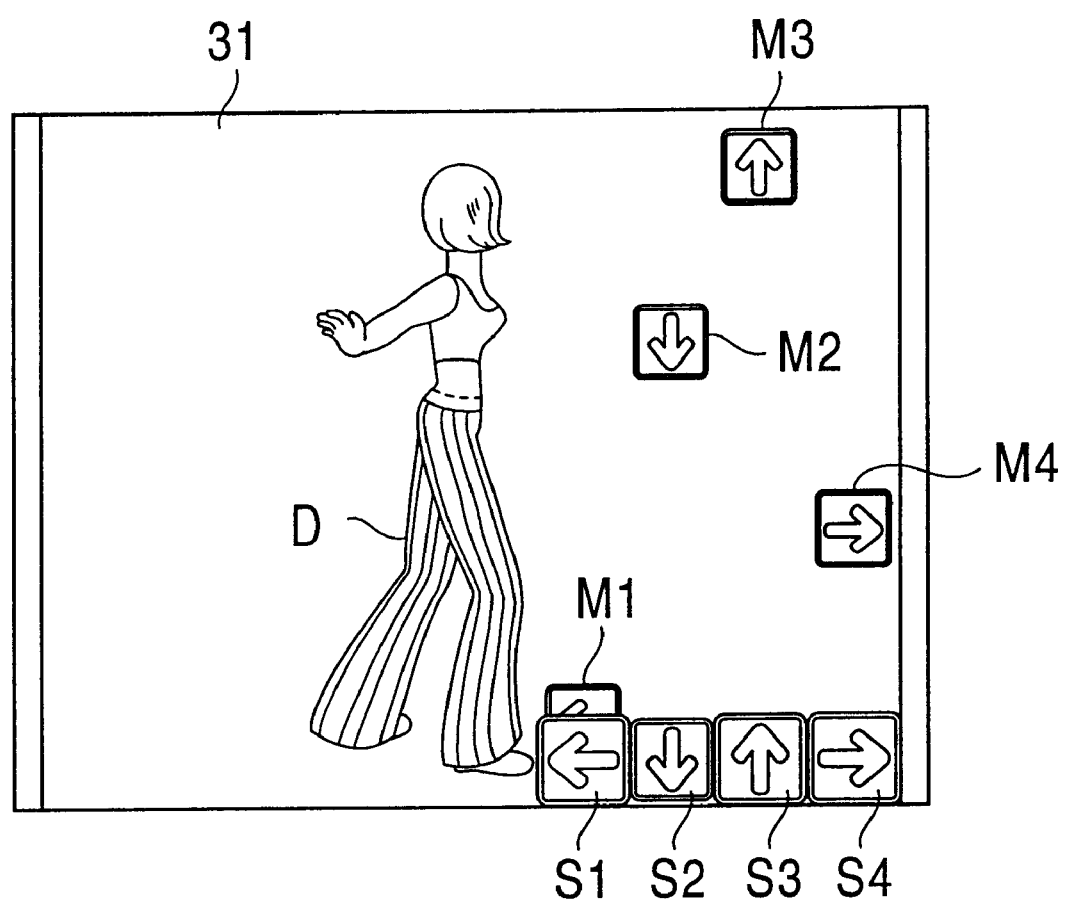
FIG. 13 is shows an example monitor display screen.

FIG. 13 shows an example display screen (mode of four-beat one-set data) on the monitor 12. The figure shows a case where the game player plays the game on the switch unit 200, and the background of a dance image D, and step-position-instructing marks M1 to M4 that scrolls and moves from an upper portion of the screen toward a lower portion at a predetermined speed are displayed in the order of M1, M4, M2, and M3. Static marks S1 to S4 which are displayed in the lower end of the display screen and represent leftward, downward, upward, and rightward marks provide timing instructions. Condition in which the scrolled mark M completely overlaps (matches) the static mark S guides the game player to the step-motion timing. In time with when the mark M completely overlaps the static mark M, the display brightness or the color of the static mark S is momentarily changed so as to explicitly indicate timing agreement. In this embodiment, the leftward arrow mark 1 corresponds to the foot switch 200c, the downward arrow mark M2 corresponds to the foot switch 200b, the upward arrow mark M3 corresponds to the foot switch 200a, and the rightward arrow mark M4 corresponds to the foot switch 200d. For reference, the figure shows a dance image in a relatively low rank of difficulty.

The step-motion-monitoring section 112 detects whether or not the four foot switches 200a to 200d, arranged in the switch unit 200, are switched from the OFF state to the ON state. The step-motion-monitoring section 112 processes an ON time when the first one of the four foot switches 200a to 200d is turned ON as detection data, and in addition, detects the ON state identifiably for each of the foot switches.

(Game Operations)

Figure 14A:
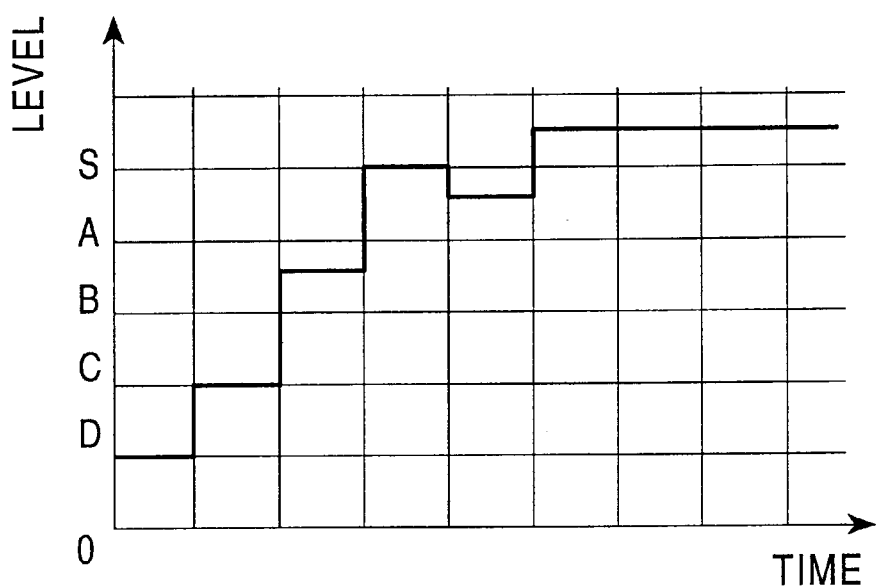
FIG. 14A is illustrative of evaluation scores.
Figure 14B:
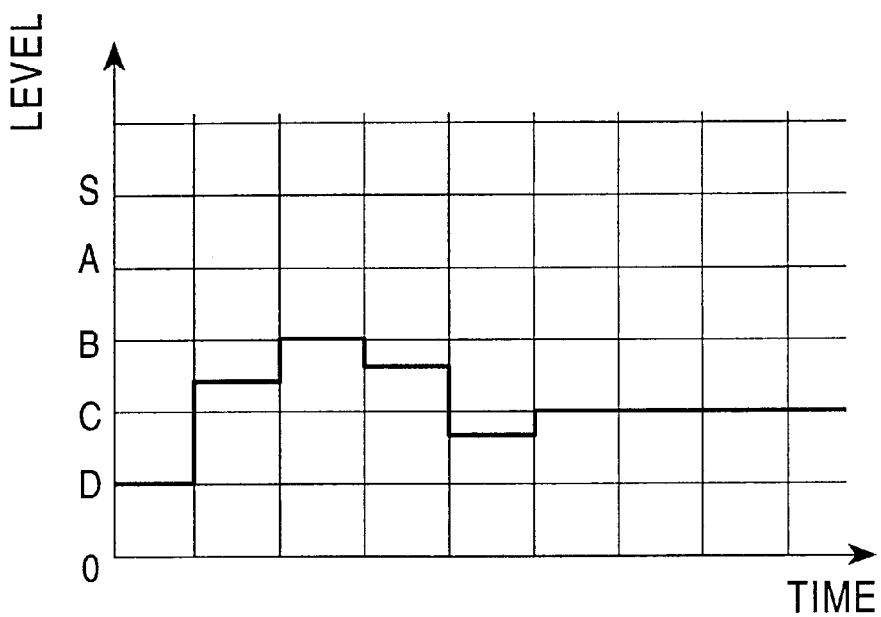
FIG. 14B is illustrative of evaluation scores.
Figure 15:
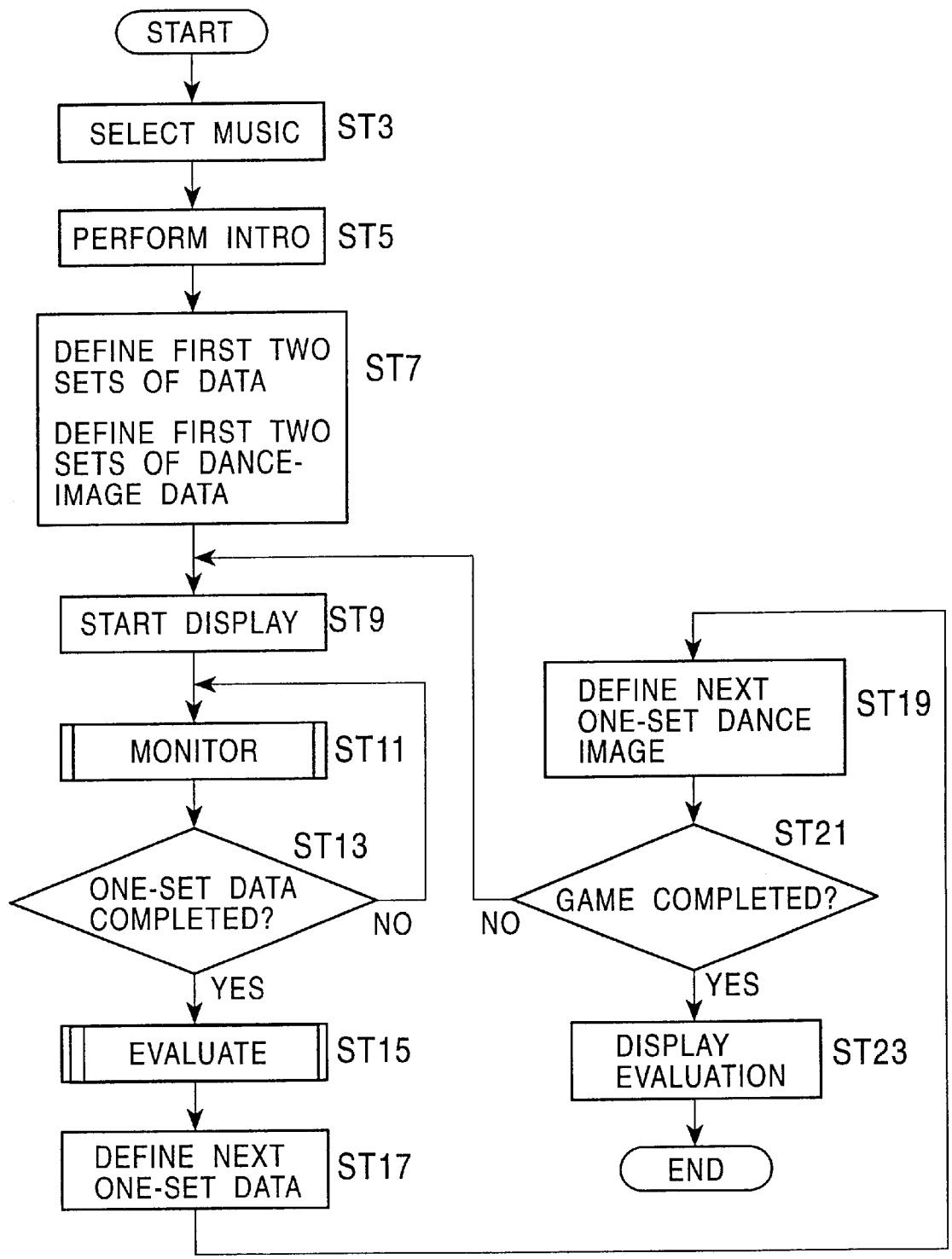
FIG. 15 is a main flowchart of game operations.
Figure 16:
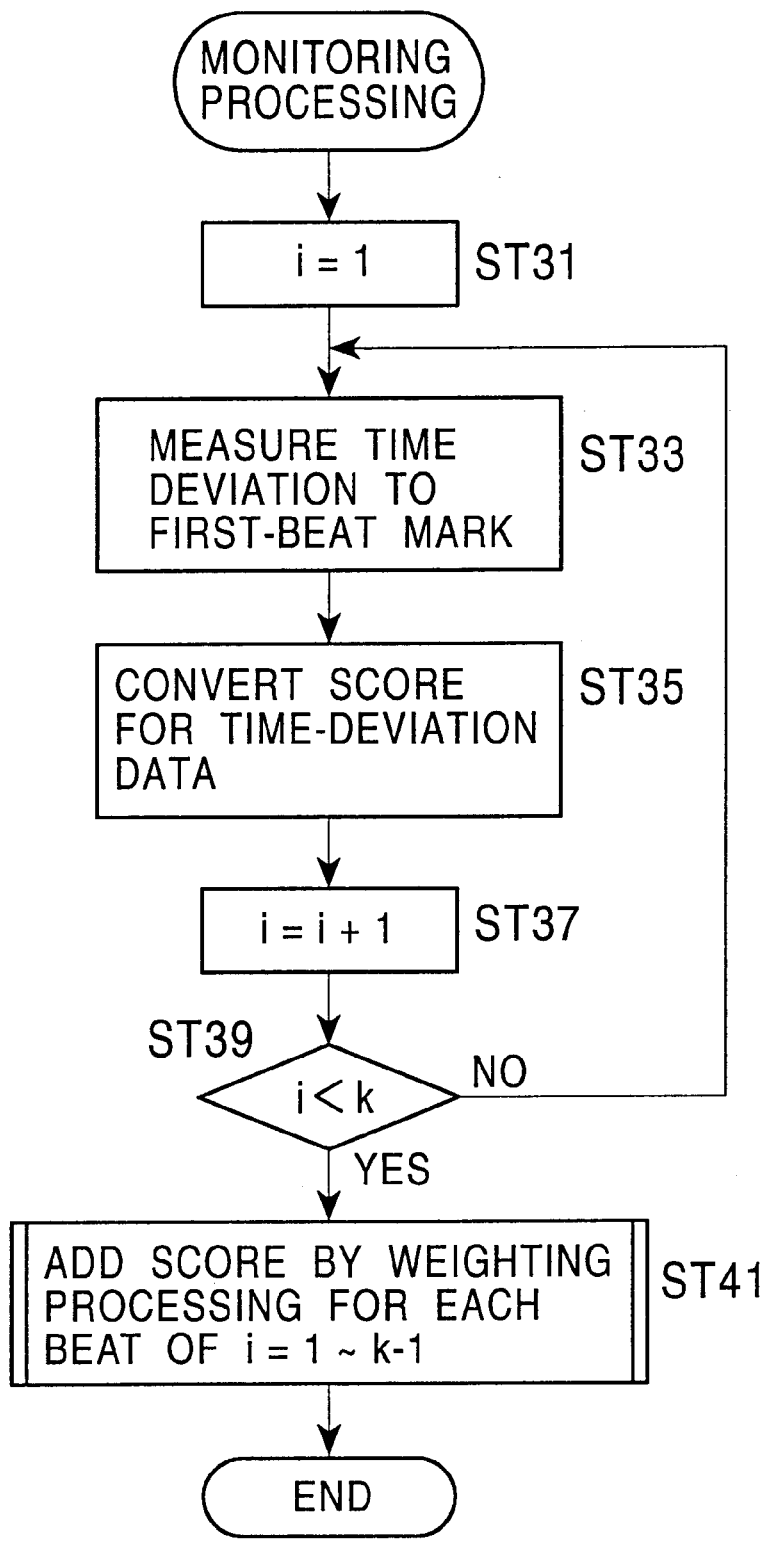
FIG. 16 is a flowchart of a monitoring processing in step ST11 in FIG. 15.
Figure 17:
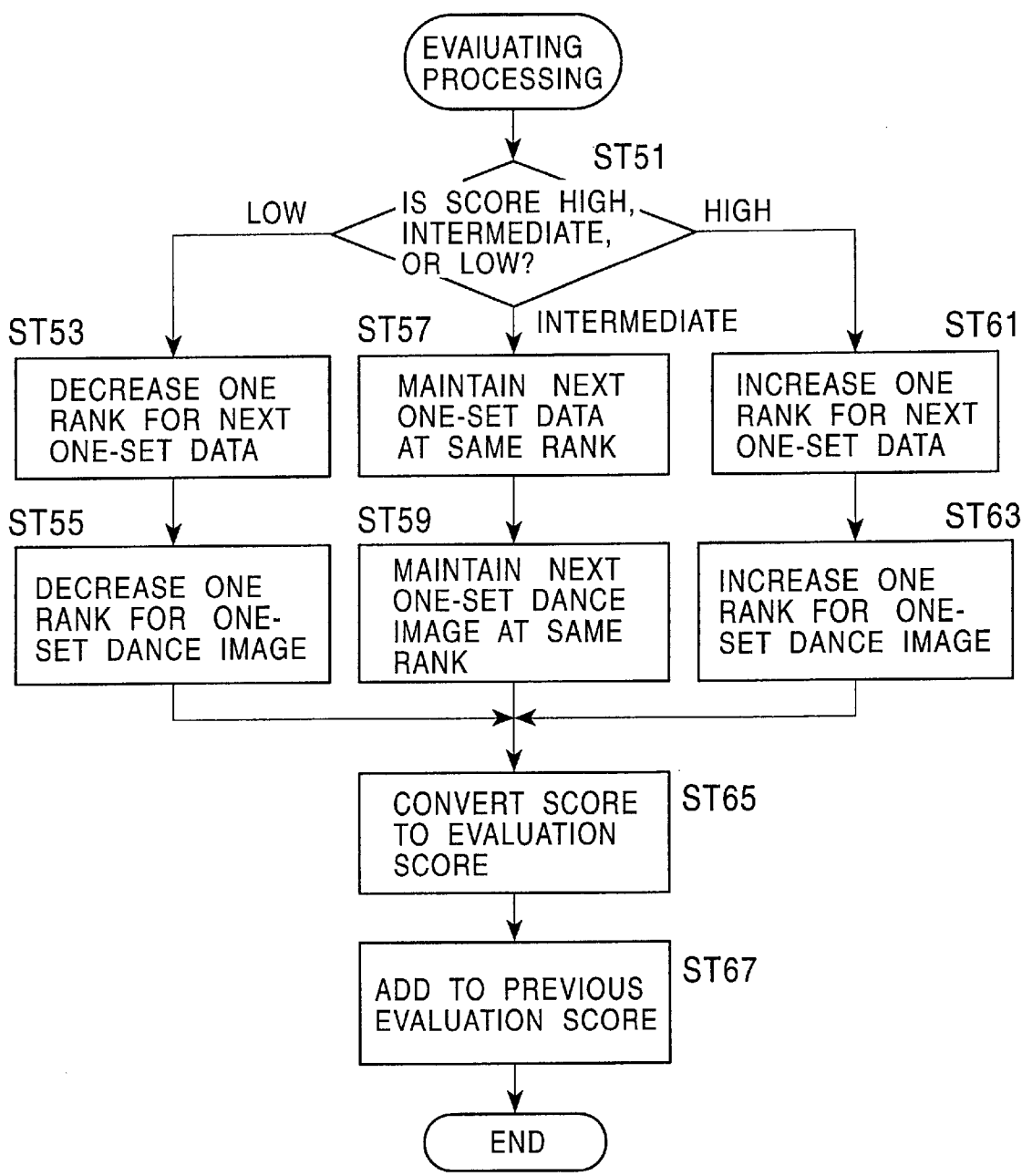
FIG. 17 is a flowchart of an evaluating processing in step ST15 in FIG. 15.

Next, referring to FIGS. 14 and flowcharts in FIGS. 15 to 17, game operations of the game system are described.

FIG. 15 shows a main flowchart of the game operations. First, upon detection of ON of the start button 22a of the controller 22, the monitor 12 displays a music-title selecting screen (step ST3). On this screen, for example, music titles are listed vertically and horizontally. When a desired music piece is selected from the list by using, for example, the upward key 22U of the controller 22, or a game-selecting switch 200e, the music-title-selecting section 103 reads out music data corresponding to the selected music title from the music data memory 104, temporarily stores the data in the buffer 14 (shown in FIG. 2), and concurrently outputs the data to the speaker 16 (step ST5). Upon start of intro music, from the step-position-instructing data memory 105, the system specifies a table that contains a rhythm corresponding to the selected music in the number of beats. Also, as first two pieces of one-set data, the system defines data on a predetermined position of the table, for example, step-position-instructing data having data of an intermediate difficulty level. Concurrently, according to the aforementioned rhythm, the system defines a dance image in a difficulty level corresponding to the difficulty level of the defined step-position-instructing data (step ST7).

After definition of the first two pieces of one-set data of the step-position-instructing data, as shown in FIG. 13, one piece of the one-set data is scrolled and displayed on a display screen 31 as the step-position-instructing mark M (step ST9). Upon start of scrolling-display of the individual step-position-instructing marks, the rhythm-setting section 106 starts monitoring processing (step ST11). Monitoring processing is executed in the units of the one-set data (step ST13). Also, upon transfer of the monitoring result for one one-set data, the deviation-detecting/adding section 107 performs evaluation according to the monitoring result (step ST15).

Upon receipt of the evaluation result, the system defines the next one-set data. In specific, upon receipt of the result of evaluation performed according to the result of monitoring for the first one-set data, the system defines a third one-set data. Concurrently, the system defines a dance image D corresponding to the defined one-set data (steps ST17 and ST19). In specific, since the step-position-instructing mark for the one-set data defined as the evaluation object has already been scrolled out of the display screen 31, and the step-position-instructing mark according to the next one-set data is being scrolled and displayed on the display screen 31, the one-set data to be defined according to the evaluation result is defined with delay of one piece of one-set data.

Consecutively, the system determines whether or not the game ends, that is, whether or not a predetermined time has passed from the game start time; or whether or not the dance evaluation is maintained to be higher than a predetermined level (step ST21). If the dance is not ended, control returns to step ST9, and the dance image D and the step-position-instructing mark M are continuously displayed on the display screen 31. Also, steps ST9 to ST19 are repeated sequentially for each one-set data.

If the system determines the game to be ended, it displays the final contents of the rhythm-setting section 107, i.e., the evaluation result for dancing by the game player, on the display screen 31 (step ST23).

FIG. 16 is a flowchart of a subroutine of the "monitoring processing" in step ST11. In the figure, variable "i" is set to "1" (step ST31). In this, the system first detects an ON signal from the foot switches 200a to 200d (FIG. 11), which can be actually obtained from the step-motion-monitoring section 112 for the step-position-instructing mark M of the first beat. Then, the system measures ±time deviation as deviation-time data with respect to the time when the mark M completely overlaps the static mark S (step ST33). In this, the one-beat cyclic period is divided into ±½ cyclic periods in the time direction (stroke direction of the mark M) with reference to the static mark S. The time deviation is measured by measuring deviation of the detected actual step time from the time when the mark M completely overlaps the static mark S in the divisional periods. The time when the mark M completely overlaps the static mark S can be obtained by calculation from one-beat cyclic period, thereby allowing production of data on time deviation from the time of detection of the ON signal from the step-motion-monitoring section 112, which is inputted on condition that the corresponding foot switches 200a to 200d are stepped. To handle a case when incorrect foot switches 200a to 200d are stepped, the game system may be arranged such that the system assumes that no stepping is carried out, or provides a stricter evaluation, for example, a reverse evaluation. Alternatively, the system may be arranged that incorrect stepping motions are counted, and when the count reaches a predetermined number, the game is forcibly terminated.

Subsequently, the system converts the gap between timing deviated by the ½ cyclic period and timing when the both marks M and S completely overlap each other to, for example, scores "0" to "100" (step ST35) for representation. For example, the score "0" is represented for an actual stepping motion performed at the time deviated by the ½ cyclic period in the both ± directions; and the score "100" represents an actual stepping motion performed when both the marks M and S completely overlap each other.

Upon completion of score conversion of data on one-beat time deviation with respect to the mark M, the system increments the variable "i" by "1" (step ST37), and determines whether or not the variable "i" is smaller than a predetermined number "K" (step ST39). The predetermined number "K" is determined corresponding to the number of beats, data of which is contained in the table selected in the step-position-instructing data memory 105, such as in that value "5" is set in the case of the one-set data composed of four beats, and value "9" is set in the case of the one-set data composed of eight beats. When the one-set data is composed of four beats and if the variable "i" is determined to be smaller than "5", control returns to step ST33, and the score is obtained for the next mark M in the same procedure described above. If the variable "i" reaches "5" (YES in step ST39), since a score for four beats is obtained, scoring processing is performed so as to obtain an evaluation for the one-set data by multiplying the individual scores with the variable "i=1 to 4" with a weight coefficient (step ST41). For example, compared to the first and third beats, the second and fourth beats are difficult in making the rhythm, the weight coefficient of 12.5% is multiplied for the first beat and the third beat, 25% is multiplied for the second beat, and 50% is multiplied for the fourth beat, whereby the score is figured out on the basis of a full score of "100". For reference, for the one-set data composed of eight beats, the weight coefficients may be allocated appropriately so as to be 100% in total. Also, the weight coefficients may be set as desired, or may be set equally by, for example, 25% (in the four-beat mode) and 12.5% (in the eight-beat mode).

FIG. 17 is a flowchart of a subroutine for "evaluating processing" of step ST15. In the figure, the system determines whether a score obtained in step ST41 is high, intermediate, or low. The high score ranges from 80 to 100 points, the intermediate score ranges from 21 to 79 points, and the low score ranges from 0 to 20 points.

Now, with the score of 20 points, for the one-set data to be set next, one-set data with the difficulty which is one rank lower than the current rank is defined (step ST53), and the dance image D also with the difficulty which is one rank lower than the current rank is defined (step ST55). With the score ranging from 21 to 79 points, for the one-set data to be set next, one-set data with the same difficulty rank as the current rank is defined (step ST57), and the dance image D also with the same difficulty rank as the current rank is defined(step ST59). For identical difficulty levels, multiple types of tables for the step-position-instructing data and the dance image D are stored. Therefore, it is preferable to arrange that as many different types of data as possible can be defined for definition of identically ranked data. For example, it is preferable that change is made in the directions of the difficulty level, as shown in FIGS. 12A and 12B, within a range of identically ranked data pieces. Alternatively, it random definition is made within the identical ranks. In contrast, with the score ranging from 80 to 100 points, for the one-set data to be set next, one-set data with the difficulty rank which is one rank higher than the current rank is defined (step ST61), and the dance image D also with the difficulty rank which is one rank higher than the current rank is defined (step ST63).

Upon completion of defining processing for the next step-position-instructing data and dance image, the system converts the current score to an evaluation score (step ST65), and adds this score to the immediately previous evaluation score (step ST67).

FIGS. 14A and 14B are views illustrative of the evaluation score. FIG. 14A shows a state in which the evaluation score increases and is stable in a high level. FIG. 14B shows a state in which the evaluation score slightly increases, but thereafter, is stable in a low level. The horizontal axis represents time, and thin lines represent time widths of one-set data pieces. The vertical axis represents ranks, and thin lines represent widths of individual ranks ranging from the highest rank S to the lowest rank D. Evaluation is performed sequentially for each of the one-set data, as shown in the FIGS. 14A and 14B, and the evaluation result is added on at each evaluation. This allows the final evaluation to be obtained, thereby rhythm sense and dance ability of the game player can be effectively notified to the game player.

As described above, the flat foot switch unit of the present invention has a predetermined surface shape and a stepping-motion-detecting pressing switch arranged internally in at least one of a plurality of regions formed by dividing the surface shape, characterized by having the slippage-preventing means provided at least in the regions on the surface of the top layer of a sheet unit, which is part of the surface shape, and in which the pressing switches are arranged. According to this invention, the slippage-preventing means is provided at least in the regions where the pressing switches are provided on the surface of the sheet unit which is the top face, thereby allowing prevention of problems in which the game player and the like slips on the sheet surface or slips and falls down during stepping motions. Consequently, the game player and the like can reliably perform switching operations by stepping on the regions on the surface of the sheet unit where the pressing switches are arranged.

The present invention has a home position on the surface of the first sheet, in which the grooves 211a are formed in a direction diagonal to a direction from the home position to positions where the individual pressing switches are arranged. These grooves 211a may be provided in only regions where the pressing switches are arranged, and the direction in which the grooves 211a are formed may differ depending upon the region. In this case, the grooves 211a cross always a step out direction; therefore, slippage can be effectively and reliably prevented. Also, when the direction in which the grooves are formed is the substantially 45° diagonal direction or substantially +45° and −45° diagonal directions, the grooves 211a allows slippage during stepping motions to be effectively prevented.

Also, the described embodiment has four foot switches, but the number thereof may be at least one, that is, may be two, three, or more than four. In addition, the foot switch or the foot switches may be optionally arranged. This is also true of the game-selecting switches.

Also, the described embodiment has the mat section 220 consisting of the 3×3 mat pieces 221 to 229, of which the entire shape is substantially square. However, the entire shape of the mat section 220 consisting of the 3×3 mat pieces may be circular. Also, not only the 3×3 mat pieces, but also an appropriate number of mat pieces including a center piece and other divisional pieces may be arranged in the peripheral direction.

Also, for the described embodiment, two types of inter-mat-piece differences in hardness are arranged so that the square position of the foot switch can be recognized. However, three or more types may be arranged so as to allow recognition of the square position of the foot switch and the center piece, or recognition of the square position with the corresponding game-selecting switch.

Also, the described embodiment includes two-dimensional engaging sections of the center piece and other mat pieces, which have reverse-cuneiform projections or grooves or combinations thereof. However, the engaging sections of the center piece and other mat pieces may be not only the planar types, but also types such as that engaging sections are overlapped, in which a concave section (or, projection section) in the upper half of one piece, a projection section (or, a concave section) is formed on the lower half of the other piece, and the two are engaged three-dimensionally.

Also, in the described embodiment, as a pattern of grooves formed on the sheet surface including the foot switch for preventing slippage, as shown in FIG. 6, linearly patterned grooves 211a are formed parallel to one direction of diagonals of the foot switch section 210. However, various other groove patterns can be considered. Other patterns include broken lines, curved lines, polygonal lines, or a combination thereof; linear grooves, broken lines, curved lines, polygonal lines, or a combination thereof in the abovementioned two directions; and in addition, a mesh pattern.

The described embodiment has the flat foot switches that can detect stepping motions in the dance game with the home-use game machine. However, as a matter of course, the application range of the present invention is not limited to the above, the invention can be applied to all that are operated by the foot, such as those used as auxiliary tools for switching operations.

What is claimed is:

1. A foot switch unit comprising:
   a home position part;
   a plurality of switches disposed about the home position part, said switches having an outer switch surface;
   elongated anti-slip grooves disposed in the outer switch surfaces;
   said elongated grooves in each of the outer switch surfaces being disposed in spaced parallel array so as to form alternating elongated grooves and elongated flat surface portions;
   said elongated grooves being disposed in a direction diagonal to a line extending from the home position part to each respective outer switch surface.

2. The flat foot switch as claimed in claim 1, wherein:
   said plurality of switches and said home position part form a rectangle; and
   two switches of said plurality of switches are disposed on opposite sides of a middle switch, wherein said elongated grooves in the outer switch surface of one of the last said two switches extends in a direction substantially perpendicular to the elongated grooves in the outer switch surface of the other of the aforesaid two switches.

3. The flat foot switch as claimed in claim 2, wherein said two switches and said middle switch are disposed in linear array.

4. The foot switch unit as claimed in claim 1, wherein the outer switch surfaces are formed of ethylene-methyl methacrylate.

5. A foot switch unit comprising:
   a sheet having an upper flat surface, said sheet having a first section forming a home position and a plurality of second sections disposed about said first section forming switch sections;
   switches underlying said switch sections;
   elongated grooves in said switch sections of said upper flat surface disposed in spaced parallel array so as to form alternating elongated grooves and elongated upper flat surface portions;
   said elongated grooves in each switch section extending in a direction transversely of a line extending from the home portion to each respective switch section.

6. A foot switch unit according to claim 5 wherein said sheet has four sides including two lateral sides and two flanking sides, a first switch section being bounded by one flanking side and one lateral side, a second switch section being bounded by said one flanking side and the other of said lateral sides, said grooves in said first and second switch sections being disposed at an acute angle relative to said one flanking side, said grooves in said first switch section extending transversely to said grooves in said second switch section.

7. A first switch unit according to claim 6 wherein said grooves in said first switch section extend perpendicular relative to said grooves in said second switch section.

8. A first switch unit according to claim 6 wherein said grooves in said first switch section form an acute angle relative to said one flank side and said grooves in said second switch section form an acute angle relative to said one flank side.

9. A first switch unit according to claim 6 wherein a third switch section is bounded by said one flank side and is disposed between said first and second switch sections, the grooves in said third switch section forming an acute angle with said one flank side.

10. A first switch unit according to claim 9 wherein said first, second and third switch sections are disposed in linear array.

11. A first switch unit according to claim 6 wherein said sheet has four sides disposed about a central area, said home position being disposed at said central area, said sheet having at least four corner areas, and first and second switch sections being disposed at said two corner areas.

12. A first switch unit according to claim 9 wherein said home section has four home section sides, said third switch section being juxtaposed to a first home switch side, and fourth, fifth and sixth switch sections being juxtaposed to the other three home switch sides respectively.

13. A flat foot switch comprising:

a central home position part;

a plurality of switches disposed juxtaposed about the central home position part;

slippage preventing means in the form of elongated grooves disposed on an upper surface of said plurality of switches;

said plurality of switches forming a rectangle having four corners, a direction of said elongated grooves of said plurality of switches not occupying corners of said rectangle being substantially one of a 45° diagonal direction or a −45° diagonal direction to a reference line extending from a center position of the central home position part to a center position of each respective switch not occupying corners of said rectangle, and a direction said elongated grooves of said plurality of switches occupying corners of said rectangle being substantially perpendicular to a line extending from a center position of the central home position part to a center position of each respective switch occupying corners of said rectangle.

14. A flat foot switch having a predetermined surface shape and a home position for a player, said foot switch comprising:

a transparent top sheet formed with slippage preventing means on the top surface thereof;

a second sheet placed underneath said top sheet having a home position, said second sheet being printed with markings around said home position indicating a plurality of stepping positions, said stepping positions correspond to regions for the player to step on;

a sheet shaped common electrode placed underneath and abutting said second sheet;

a fourth sheet formed with a plurality of through holes placed underneath said sheet shaped common electrode;

a fifth sheet placed underneath said fourth sheet, provided with a plurality of separate electrodes forming separate switches at positions corresponding to said markings; and a bottom sheet placed underneath said fifth sheet, said bottom sheet is made of a durable material.

15. The flat foot switch having a predetermined surface shape and a home position for a player as claimed in claim 14, wherein the slippage preventing means includes elongated grooves.

16. The flat foot switch having a predetermined surface shape and a home position for a player as claimed in claim 15, wherein the predetermined surface shape is a rectangle and the direction of said elongated grooves are formed is one of a substantially 45° diagonal direction with respect to said rectangle and a substantially −45° diagonal direction with respect to said rectangle.

17. The flat foot switch having a predetermined surface shape and a home position for a player as claimed in claim 16, wherein the slippage prevention means is shaped as a rectangle including two corner regions wherein said elongated grooves of one of the corner regions extends in a direction substantially perpendicular to the elongated grooves of the other corner region.

18. The foot switch unit having a predetermined surface shape as claimed in claim 17, wherein the slippage preventing means is made of ethylene-methyl methacrylate.

\* \* \* \* \*